US012221909B2

(12) United States Patent
Rezkalla et al.

(10) Patent No.: US 12,221,909 B2
(45) Date of Patent: Feb. 11, 2025

(54) SLEEVED ROCKER SHAFT FOR TYPE III HEAVY DUTY VALVE TRAIN

(71) Applicant: Eaton Intelligent Power Limited, Dublin (IE)

(72) Inventors: Ramy Rezkalla, Kalamazoo, MI (US); Andrei Radulescu, Marshall, MI (US); Ryan Krieger, Portage, MI (US)

(73) Assignee: Eaton Intelligent Power Limited, Dublin (IE)

( * ) Notice: Subject to any disclaimer, the term of this patent is extended or adjusted under 35 U.S.C. 154(b) by 24 days.

(21) Appl. No.: 17/836,471

(22) Filed: Jun. 9, 2022

(65) Prior Publication Data

US 2022/0298934 A1    Sep. 22, 2022

Related U.S. Application Data

(63) Continuation of application No. PCT/EP2020/025591, filed on Dec. 18, 2020.
(60) Provisional application No. 62/950,402, filed on Dec. 19, 2019.

(51) Int. Cl.

| | |
|---|---|
| *F01L 1/18* | (2006.01) |
| *B23C 3/00* | (2006.01) |
| *F01L 9/10* | (2021.01) |
| *F01L 13/00* | (2006.01) |
| *F01M 1/06* | (2006.01) |
| *F01M 9/10* | (2006.01) |

(52) U.S. Cl.
CPC ............... *F01L 1/181* (2013.01); *B23C 3/00* (2013.01); *F01L 1/18* (2013.01); *F01L 9/10* (2021.01); *F01L 13/0005* (2013.01); *F01M 1/06* (2013.01); *F01M 9/107* (2013.01); *F01L 2013/001* (2013.01); *F01M 2001/064* (2013.01)

(58) Field of Classification Search
CPC ..... F01L 1/181; F01L 1/18; F01L 1/06; F01L 9/10; F01L 13/0005; F01L 2013/001; F01M 1/06; F01M 9/107; F01M 2001/064
USPC ...................................................... 123/90.14
See application file for complete search history.

(56) References Cited

U.S. PATENT DOCUMENTS

| | | | |
|---|---|---|---|
| 2006/0054405 A1* | 3/2006 | Custer | F01L 1/181 184/6 |
| 2018/0223705 A1* | 8/2018 | Karlsson | F01L 1/181 |

FOREIGN PATENT DOCUMENTS

| | | |
|---|---|---|
| DE | 364936 C | 2/1923 |
| DE | 19510762 A1 | 1/1996 |
| DE | 102014215406 A1 | 2/2016 |

OTHER PUBLICATIONS

International Search Report and Written Opinion for International Application No. PCT/EP2020/025591 mailed May 4, 2021.

\* cited by examiner

*Primary Examiner* — Kenneth J Hansen
*Assistant Examiner* — Kelsey L Stanek
(74) *Attorney, Agent, or Firm* — Meunier Carlin & Curfman LLC

(57) ABSTRACT

A rocker shaft assembly configured to support a rocker arm and deliver oil to the rocker arm and related method of making is provided. The rocker shaft assembly includes a core shaft and a sleeve. The core shaft has a core body including a main oil supply channel formed thereon. The sleeve has passages formed thereon. The sleeve is disposed around the core shaft. The main oil supply channel aligns with at least one of the passages on the sleeve. The main oil supply is milled into the core shaft.

11 Claims, 10 Drawing Sheets

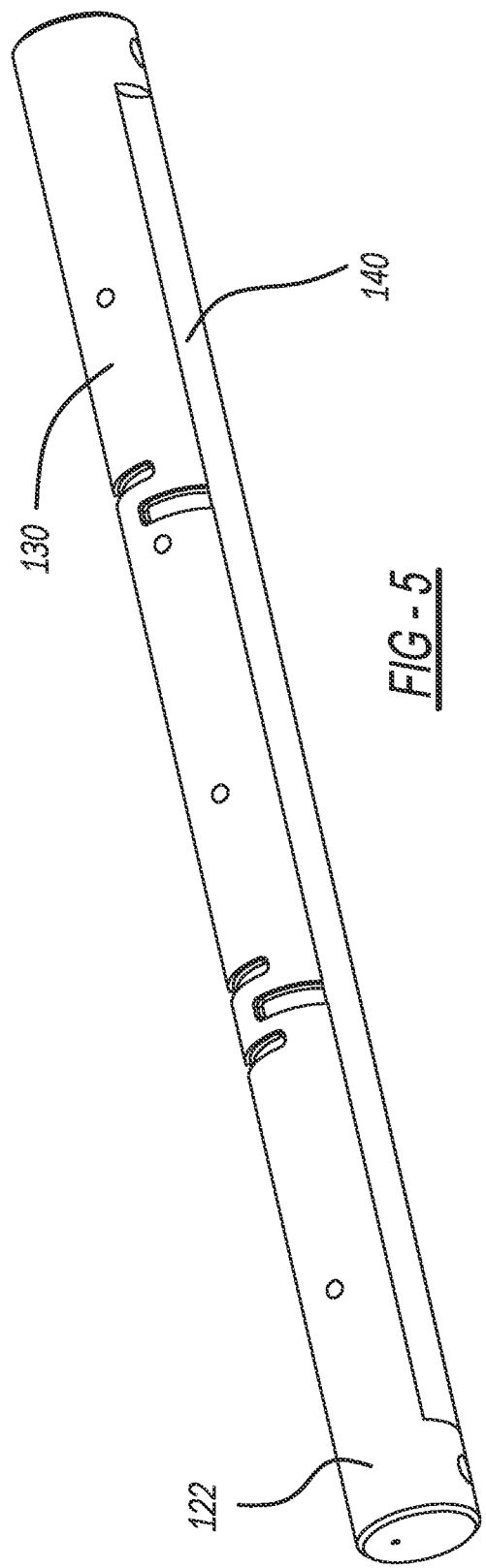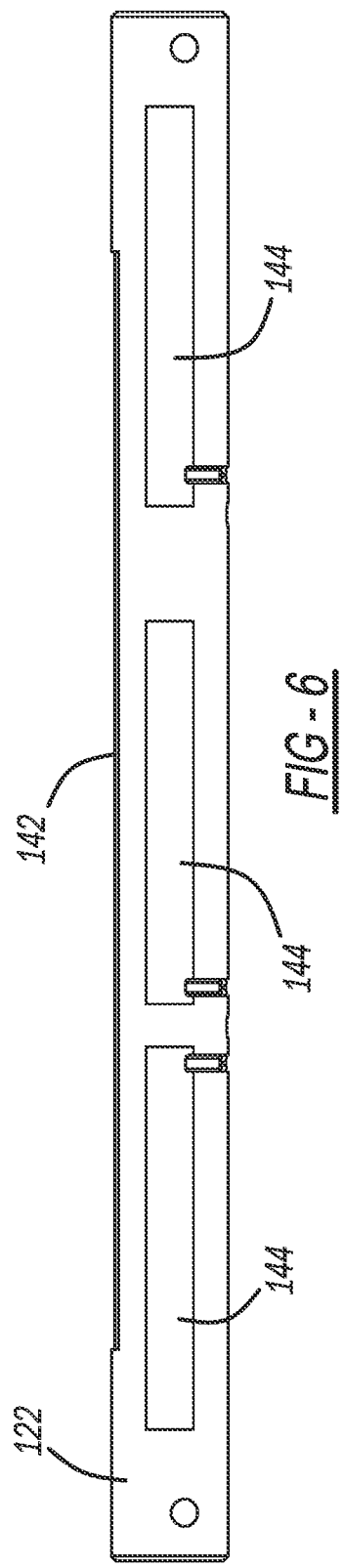

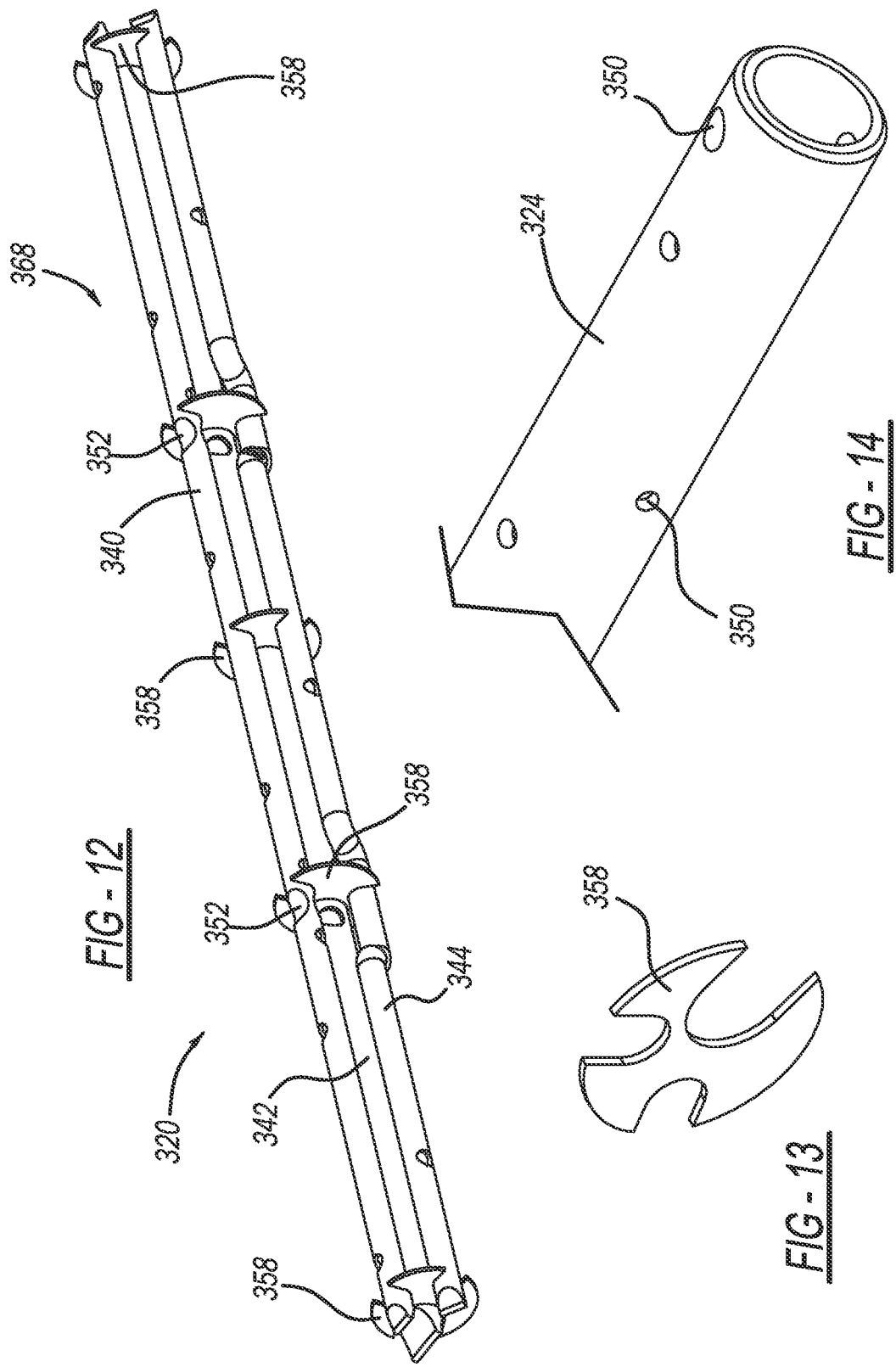

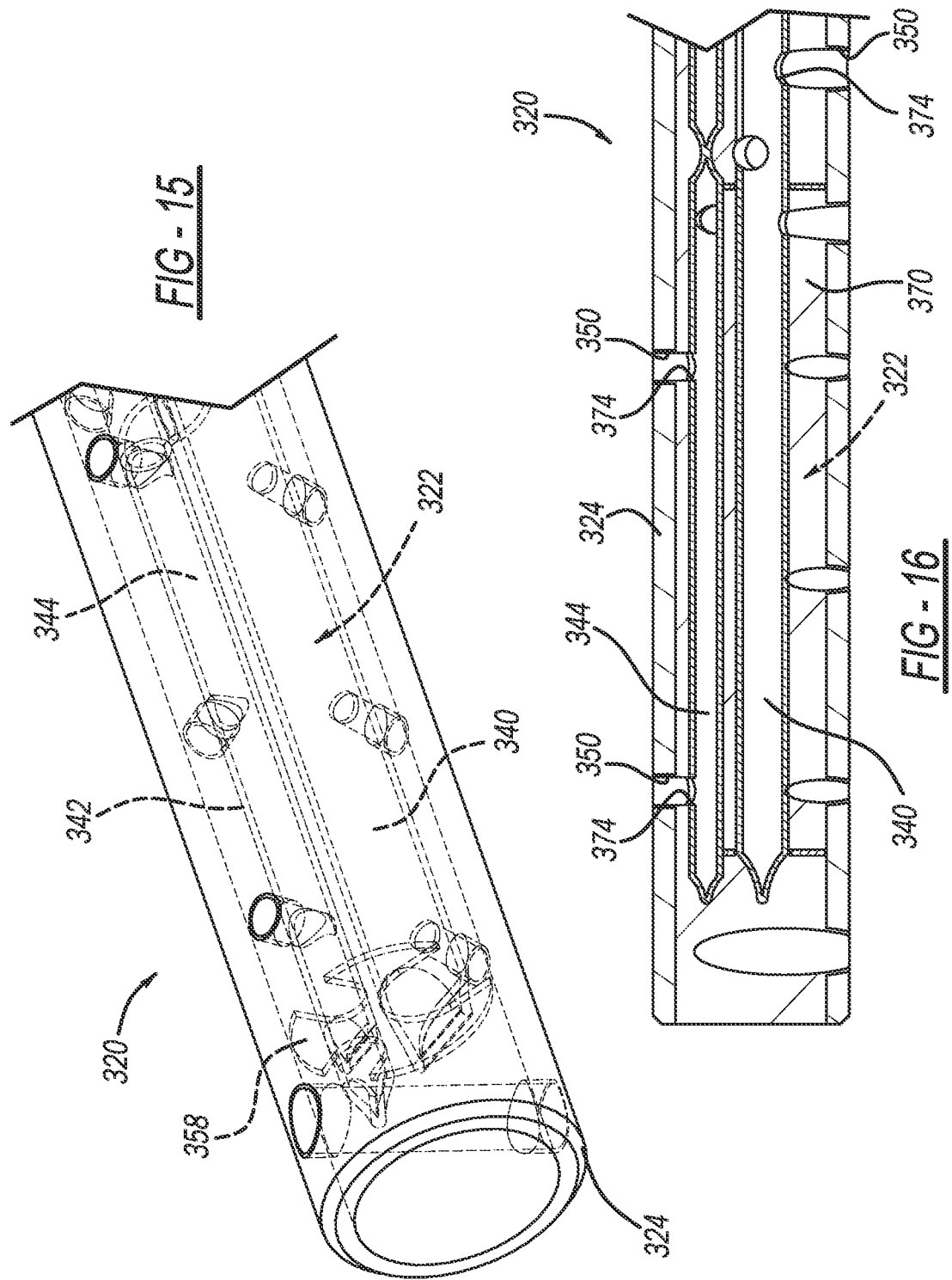

SLEEVED ROCKER SHAFT FOR TYPE III HEAVY DUTY VALVE TRAIN

CROSS REFERENCE TO RELATED APPLICATIONS

This application is a continuation of International Application No. PCT/EP2020/025591 filed Dec. 18, 2020, which claims priority to U.S. Provisional Application No. 62/950,402 filed on Dec. 19, 2019. The disclosure of the above application is incorporated herein by reference.

FIELD

The present disclosure relates generally to a rocker shaft for use with rocker arms in a valve train assembly and more particularly to a multiple piece rocker shaft having a milled portion and a sleeve portion configured to communicate oil from a cylinder head to the rocker arms.

BACKGROUND

Compression engine brakes can be used as auxiliary brakes, in addition to wheel brakes, on relatively large vehicles, for example trucks, powered by heavy or medium duty diesel engines. A compression engine braking system is arranged, when activated, to provide an additional opening of an engine cylinder's exhaust valve when the piston in that cylinder is near a top-dead-center position of its compression stroke so that compressed air can be released through the exhaust valve. This causes the engine to function as a power consuming air compressor which slows the vehicle.

In a typical valve train assembly used with a compression engine brake, the exhaust valve is actuated by a rocker arm which engages the exhaust valve by means of a valve bridge. The rocker arm rocks in response to a cam on a rotating cam shaft and presses down on the valve bridge which itself presses down on the exhaust valve to open it. A hydraulic lash adjuster may also be provided in the valve train assembly to remove any lash or gap that develops between the components in the valve train assembly.

A valve train assembly for a Type III variable valve actuation configuration includes rocker arm assemblies that rotate around a rocker shaft received by a rocker housing. The rocker shaft includes various oil supply channels configured to deliver oil to the rocker arm assemblies. The rocker shaft is typically a long shaft that requires elongated drilling to form the channels. It can be difficult to accurately manufacture such rocker shafts with precise positional tolerances.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A rocker shaft assembly configured to support a rocker arm and deliver oil to the rocker arm is provided. The rocker shaft assembly can include a core shaft and a sleeve. The core shaft has a core body including a main oil supply channel formed thereon. The sleeve has passages formed thereon. The sleeve is disposed around the core shaft. The main oil supply channel aligns with at least one of the passages on the sleeve.

According to additional features, the core body further defines a brake oil supply channel. At least one passage of the passages aligns with the brake oil supply channel. The core body can further define at least one cylinder deactivation (CDA) channel formed thereon. At least one passage of the passages aligns with the CDA channel. The core shaft can be press fit into the sleeve. The main oil supply channel is milled around an outer diameter of the core shaft. The main oil supply channel is in the form of a groove. The brake oil supply channel and the cylinder deactivation channel is milled around an outer diameter of the core shaft. The brake oil supply channel and the cylinder deactivation channel are in the form of grooves. The core shaft and sleeve are both formed of metal. The passages on the sleeve are cross drilled into the sleeve.

A method of making a rocker shaft assembly configured to support a rocker arm and deliver oil to the rocker arm includes providing a core shaft having a core body. A sleeve is provided. A main oil supply channel is milled onto the core body. A brake oil supply channel is milled onto the core body. A cylinder deactivation (CDA) supply channel is milled onto the core body. The sleeve is press-fit around the core shaft.

According to other features, the method can further comprise cross-drilling the sleeve to define passages thereon. Press-fitting the sleeve around the core shaft further includes aligning the passages on the sleeve for fluid communication with the main oil supply channel, the brake oil supply channel and the CDA supply channel on the core body.

A rocker shaft assembly constructed in accordance to additional features and configured to support a rocker arm and deliver oil to the rocker arm includes a tube assembly and a sleeve. The tube assembly has a main supply tube and at least one of a brake oil supply tube and cylinder deactivation (CDA) tube. The sleeve has passages formed thereon. The sleeve is disposed around the tube assembly. The passages intersect the main supply tube and the at least one of the brake oil supply tube and the CDA tube. An overmold can be provided between the sleeve and the tube assembly. At least one separator plate can be arranged relative to the tube assembly that locates tubes relative to each other.

A method of making a rocker shaft assembly according to additional features and configured to support a rocker arm and deliver oil to the rocker arm is provided. A main supply tube, a brake oil supply tube and a cylinder deactivation (CDA) tube can be stacked onto at least one separator plate to create a tube subassembly. The tube subassembly can be inserted into a sleeve. The sleeve can have passages formed thereon. The tube subassembly can be overmolded within the tube. Holes can be drilled into the main supply tube, the brake oil supply tube and the CDA tube. Drilling holes can further comprise referencing the passages in the sleeve as a drill path while drilling the holes into the main supply tube, the brake oil supply tube and the CDA tube. At least one of the main supply tube, brake oil supply tube and the CDA tube can be pinched at areas to inhibit oil flow thereat.

BRIEF DESCRIPTION OF THE DRAWINGS

The present disclosure will become more fully understood from the detailed description and the accompanying drawings, wherein:

FIG. 5 is a perspective view of the core shaft of FIG. 4 showing a main oil supply;

FIG. 6 is a side view of the core shaft of FIG. 4 and showing a brake oil supply channel and cylinder deactivation (CDA) oil supply channels;

FIG. 12 is a side view of a tube assembly of the sleeved rocker shaft assembly of FIG. 11;

FIG. 13 is a perspective view of a separator plate used in the tube assembly of FIG. 12;

FIG. 14 is a partial perspective view of the sleeve of the sleeved rocker assembly of FIG. 11;

FIG. 15 is a partial perspective view of the sleeved rocker shaft assembly of FIG. 11; and FIG. 16 is a partial sectional view of the sleeved rocker shaft assembly of FIG. 11.

DETAILED DESCRIPTION

Figure 1:
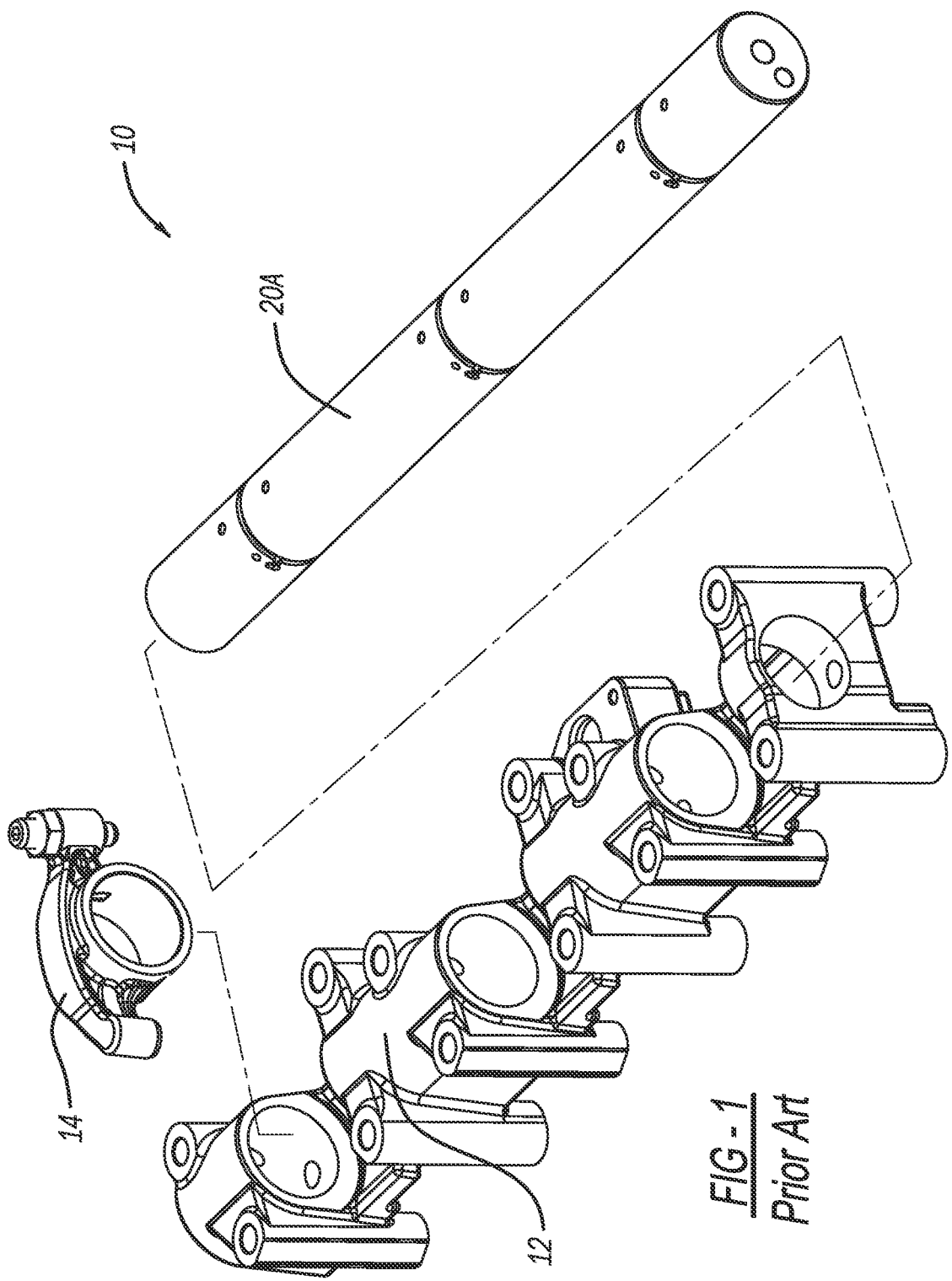
FIG. 1 is a perspective view of a partial valve train assembly incorporating a rocker arm assembly configured to rotate around a rocker shaft received in a rocker housing according to one prior art example.

With initial reference to FIG. 1, a partial valve train assembly constructed in accordance to one prior art example is shown and generally identified at reference 10. The partial valve train assembly 10 utilizes variable valve actuation and is shown configured for use in a three-cylinder bank portion of a six-cylinder engine. The partial valve train assembly 10 can include a rocker assembly housing 12 that supports a series of rocker arm assemblies 14 (only one rocker arm assembly is shown for simplicity). A rocker shaft 20A is received by the rocker housing 12. The rocker shaft 20A cooperates with the rocker arm assemblies 14 to communicate oil to the rocker arm assemblies 14 during variable valve actuation events.

Figure 2:
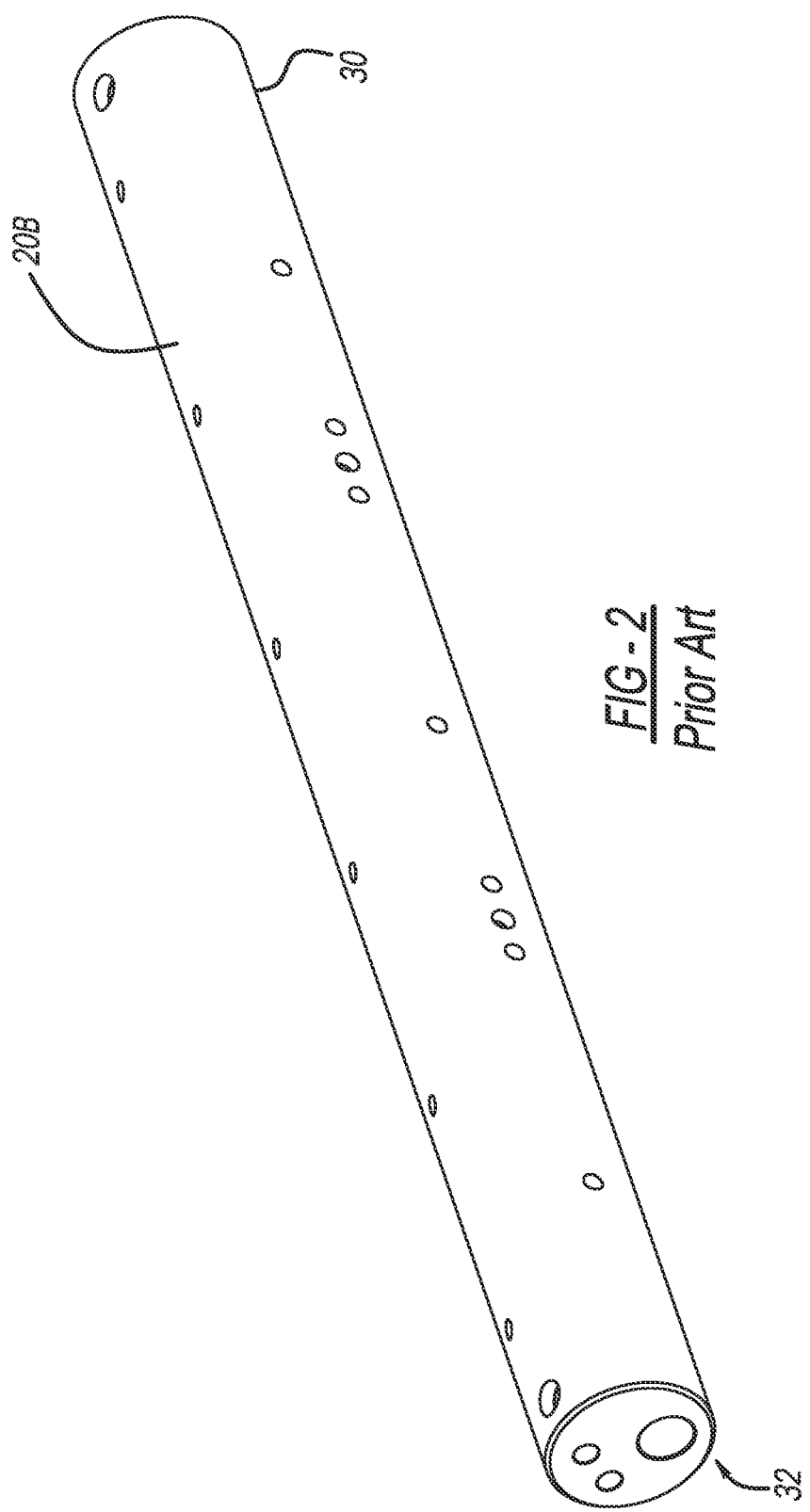
FIG. 2 is a perspective view of a rocker shaft constructed in accordance to one prior art example.
Figures 3A, 3B:
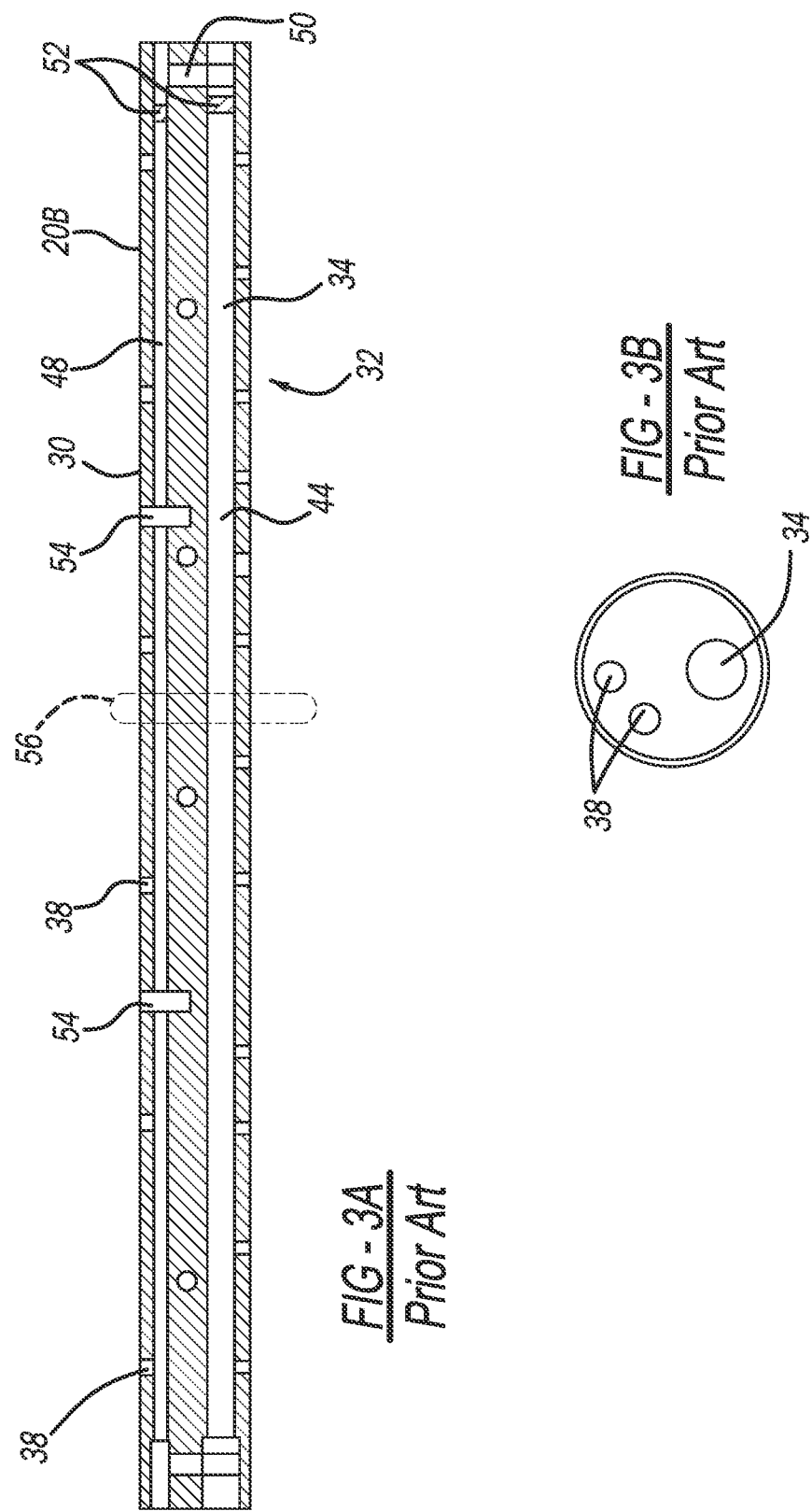
FIG. 3A is cross-sectional view of the prior art rocker shaft of FIG. 2.
FIG. 3B is an end view of the prior art rocker shaft of FIG. 2.

FIGS. 2-3A illustrate another rocker shaft 20B constructed in accordance to another prior art example. The rocker shaft 20B includes a shaft body 30 having a plurality of oil channels 32 including an oil supply channel 34 and oil delivery channels 38. The oil supply channel 34 includes a long continuous supply channel 44. Similarly, the oil delivery channels 38 include long continuous supply channels 48. The rocker shaft 20B further includes bolt holes 50 and end plugs 52. Plugs or dividers 54 can be arranged to separate controls between the oil control valves. The prior art rocker shaft 20B presents many drawbacks. For example, the rocker shaft 20B requires long manufacturing time for drilling the oil channels 44 and 48. Drilling along extended paths can be referred to as "gun drilling" and can be challenging as the length of the drill path gets longer. In some examples the bores can be greater than 400 mm. The process capability for precise positional tolerances on long drillings is difficult. It is also challenging to add support bolts (such as identified at phantom line 56) other than shaft end due to sealing issues. This can limit the design to "carrier" style mounts. The stiffness of the rocker shaft can be reduced due to the oil passages. It is difficult to maintain the minimum wall thickness between the oil holes and the oil holes to the outer diameter of the rocker shaft. Additionally, a failure mode is associated with the end plugs 52. Moreover, manufacturing costs for creating the rocker shaft 20B are high.

Figure 4:
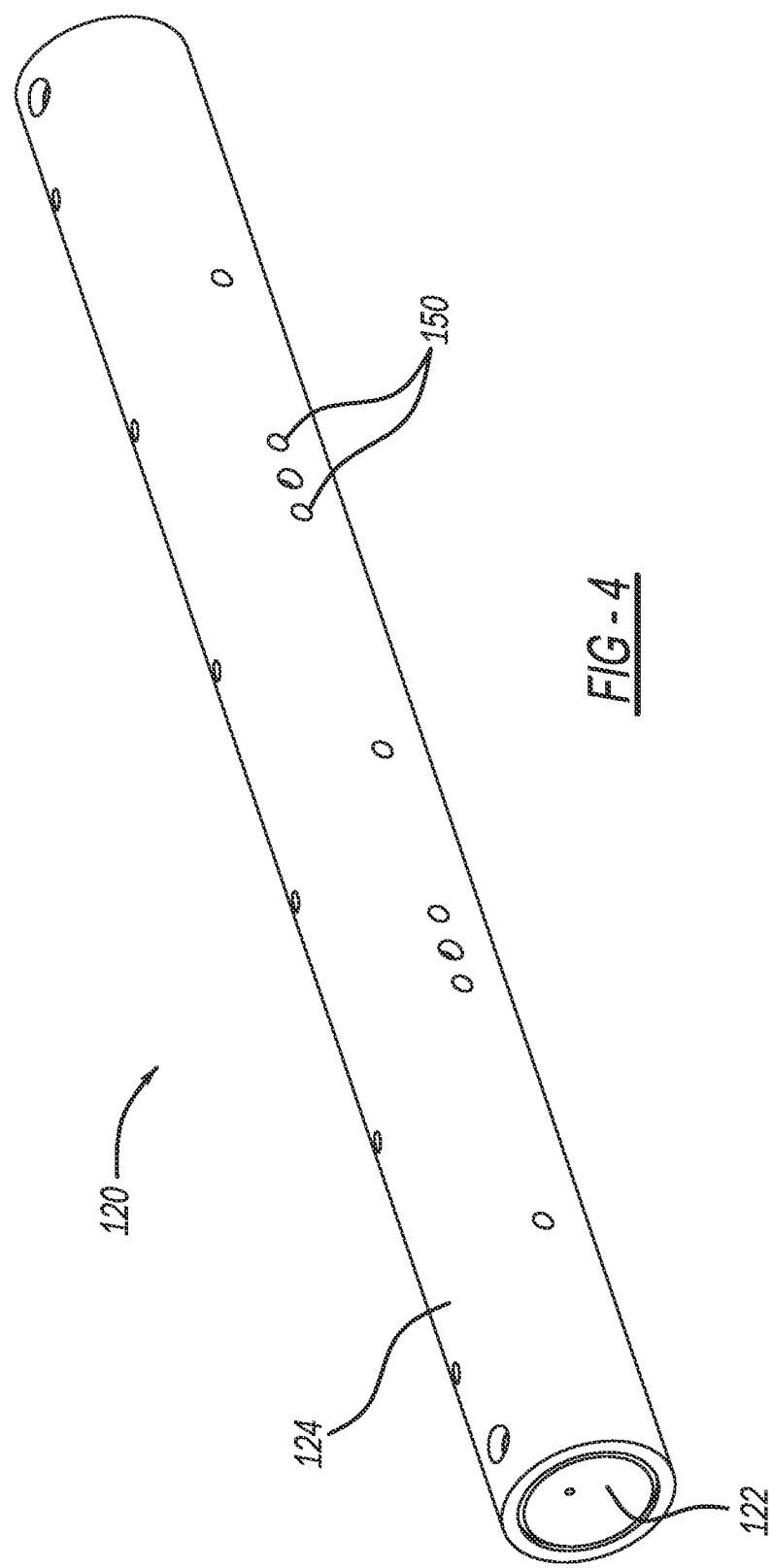
FIG. 4 is a sleeved rocker shaft assembly including a core shaft and a sleeve constructed in accordance to one example of the present disclosure.

As used herein, the following disclosure is described in the context of valve applications having cylinder deactivation and engine brake. However, the disclosures herein are equally applicable for other variable valve applications where the cylinder deactivation arm is replaced with a variable valve lift (WL) arm that alters the valve motion. With reference to FIGS. 4-6, a rocker shaft assembly constructed in accordance to a first example of the present disclosure is shown and generally identified at reference 120. The rocker shaft assembly 120 includes a core shaft 122 and a sleeve 124. In one example, the core shaft 122 and the sleeve 124 are both formed of metal. The core shaft 122 and the sleeve 124 can be manufactured separately and the core shaft 122 can be subsequently pressed into the sleeve 124. The core shaft 122 generally includes a core body 130 having a main supply channel 140, a brake oil supply channel 142 and variable valve applications such as cylinder deactivation (CDA) channels 144 formed therein.

The main supply channel 140, the brake oil supply channel 142 and the CDA channels 144 can be milled. A milling process will not require heat treatment. It will be appreciated that the orientation and placement of the main supply channel 140, brake oil supply channel 142 and the CDA channels 144 is merely exemplary and that these channels may be milled in different locations on the core shaft 122.

Figure 7B:
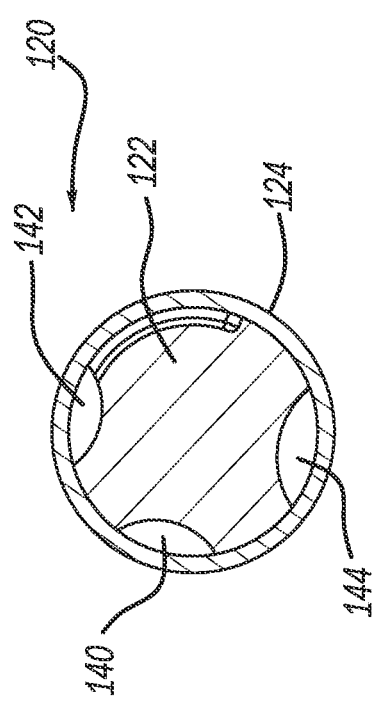
FIG. 7B is a cross-sectional view of the core shaft of FIG. 4.
Figure 7A:
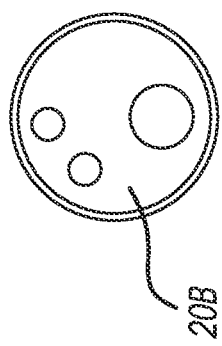
FIG. 7A is a cross-sectional view of the rocker shaft of FIG. 3A.

The sleeve 124 can include passages 150 that are cross drilled. The sleeve 124 can be press fit on the core shaft 122. The rocker shaft assembly 120 provides advantages over the prior art rocker shafts 20A, 20B. The rocker shaft assembly 120 is easier and more cost effective to manufacture. Gun drilling is replaced with cheaper milling. The positional tolerances between the communication passages is relaxed. The occurrence of thin wall or wall breakage between oil routings is eliminated. The geometries of the oil passages is more flexible. Stiffness is improved. The cylinder deactivation channel dividers are built into the rocker shaft assembly 120 so no oil leakage from prior art plugs or pressed dowels can occur. FIGS. 7A and 7B show a comparison of the prior art rocker arm shaft 20B (FIG. 7A) and the core shaft 122 of the present disclosure.

Figure 8:
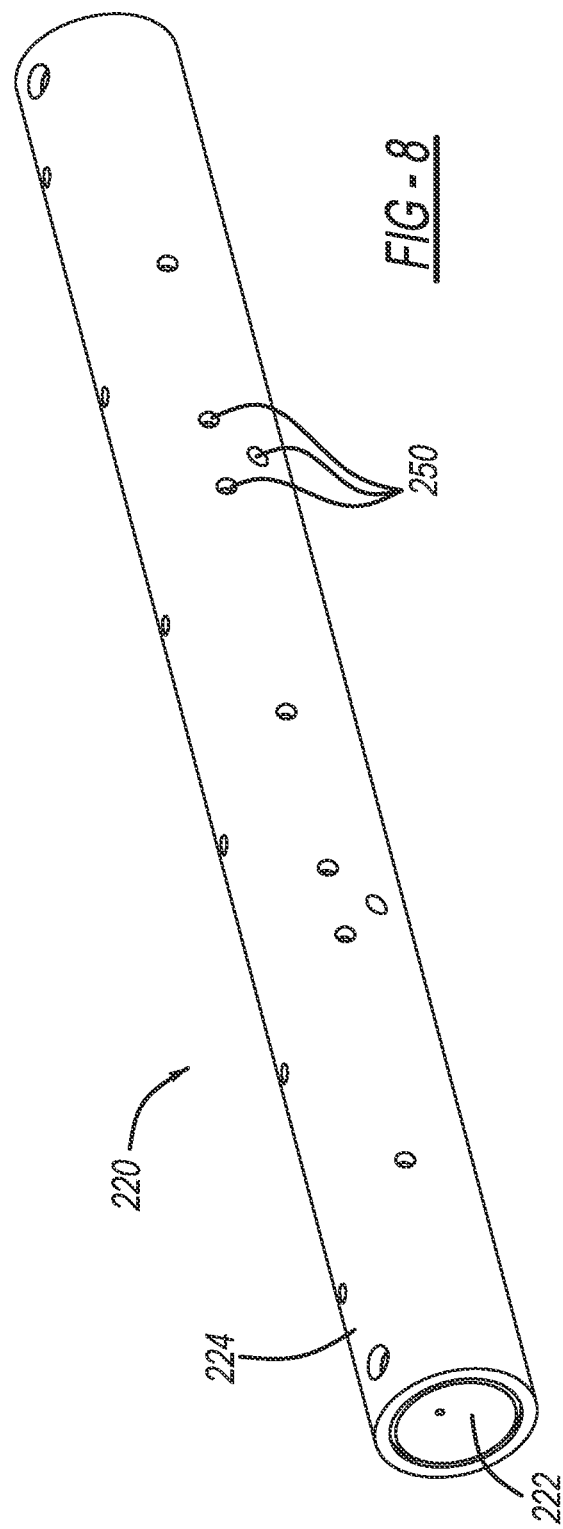
FIG. 8 a sleeved rocker shaft assembly including a core shaft and a sleeve constructed in accordance to a second example of the present disclosure.
Figure 9:
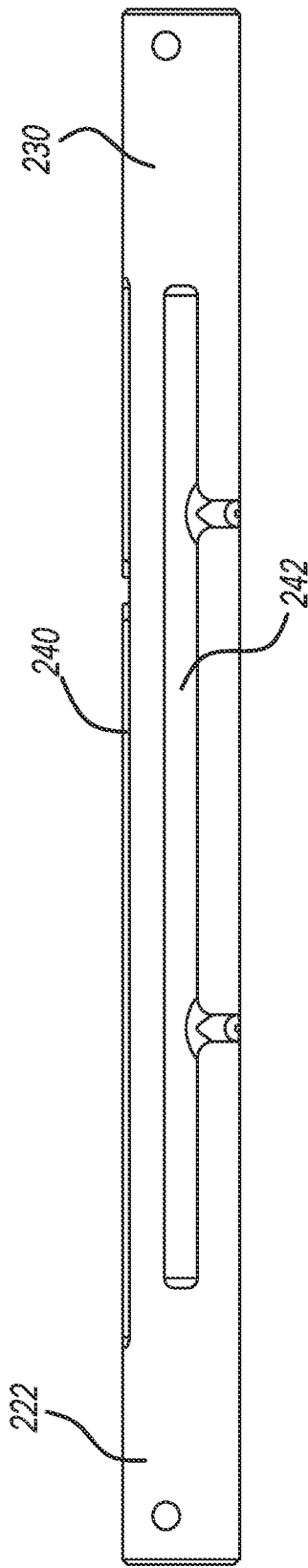
FIG. 9 is a first side view of the core shaft of the sleeved rocker shaft assembly of FIG. 8.
Figure 10:
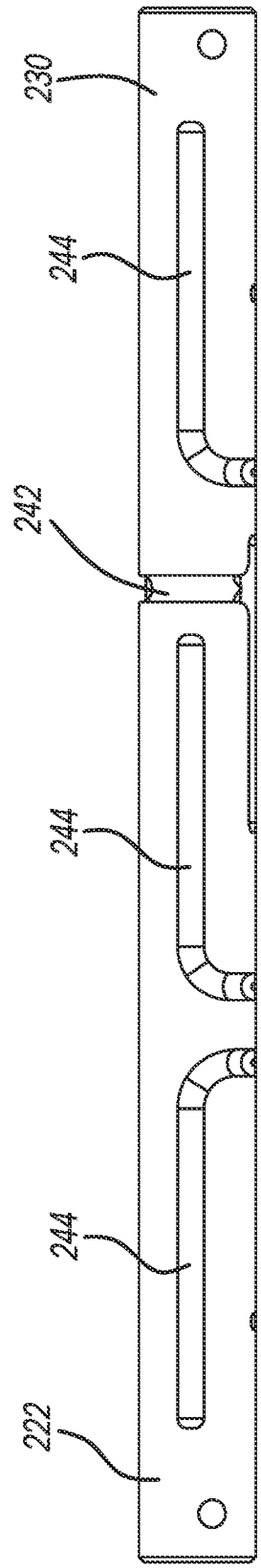
FIG. 10 is a second side view of the core shaft of the sleeved rocker shaft assembly of FIG. 8.
Figure 11:
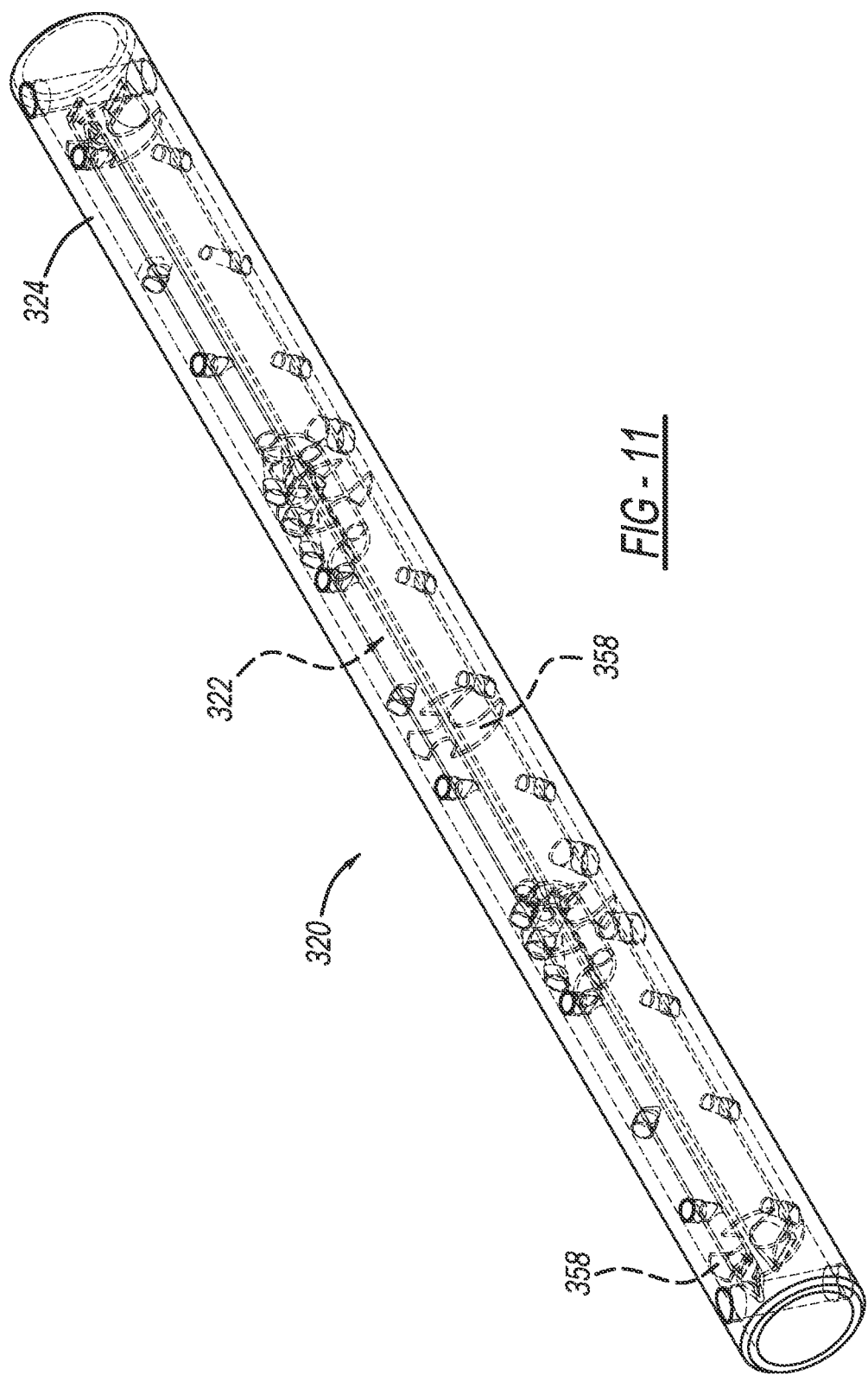
FIG. 11 a sleeved rocker shaft assembly including a tube assembly and a sleeve constructed in accordance to a third example of the present disclosure.

With reference to FIGS. 8-10, a rocker shaft assembly constructed in accordance to a second example of the present disclosure is shown and generally identified at reference 220. The rocker shaft assembly 220 includes a core shaft 222 and a sleeve 224. In one example, the core shaft 222 and the sleeve 224 are both formed of metal. The core shaft 222 and the sleeve 224 can be manufactured separately and the core shaft 222 can be subsequently pressed into the sleeve 224. The core shaft 222 generally includes a core body 230 having a main supply channel 240, a brake oil supply channel 242 and variable valve lift (VVL) or cylinder deactivation (CDA) channels 244 formed therein.

The main supply channel 240, the brake oil supply channel 242 and the CDA channels 244 can be milled. The core shaft 222 will not require heat treatment. The sleeve 224 is the wear resistance part and will require heat treatment or coating. It will be appreciated that the orientation and placement of the main supply channel 240, brake oil supply channel 242 and the CDA channels 244 is merely exemplary and that these channels may be milled in different locations on the core shaft 222.

The sleeve 224 can include passages 250 that are cross drilled. The sleeve 224 can be press fit on the core shaft 222. The rocker shaft assembly 220 provides advantages over the prior art rocker shafts 20A, 20B. The rocker shaft assembly 220 is easier and more cost effective to manufacture. Gun drilling is replaced with cheaper milling. The positional tolerances of the longitudinal milled oil passages is relaxed versus gun drilling. The positional tolerances of the communication holes 150 are similar between the processes. The occurrence of thin wall or wall breakage between oil routings is eliminated. The geometries of the oil passages is more flexible and allows changes in shape, smooth bends and transition to improve oil flow. Stiffness is improved due to possibility for additional supporting bolts and cross holes 56. The cylinder deactivation channel dividers are built into the rocker shaft assembly 220 so no oil leakage from prior art pressed plugs or dowels can occur.

With reference to FIGS. 11-16, a rocker shaft assembly constructed in accordance to a third example of the present disclosure is shown and generally identified at reference 320. The rocker shaft assembly 320 includes a tube assembly 322 and a sleeve 324. In one example, the sleeve 324 is formed of metal. The tube assembly 322 and the sleeve 324 can be manufactured separately and the tube assembly 322 can be subsequently installed into the sleeve 324. In one example, the sleeve 324 can be over molded around the tube assembly 322. The tube assembly 322 generally includes a main supply gallery or main supply tube 340, a brake oil supply gallery or brake supply tube 342 and a variable valve (VVA) or cylinder deactivation (CDA) gallery or CDA tube 344. A series of separator plates 358 can be arranged to locate the respective tubes 340, 342 and 344 relative to each other.

The sleeve 324 can include passages 350 that are cross drilled. The tube assembly 322 can be inserted into the sleeve 324. Through holes can be drilled into the sleeve that intersect the respective tubes 340, 342 and 344 for oil communication. The respective tubes 340, 342 and 344 can be pinched or staked at areas 352 to stop oil flow at desired locations. The tubes can have non-round cross-sections maximizing clearance with the sleeve 324. The rocker shaft assembly 320 provides advantages over the prior art rocker shafts 20A, 20B similar to those described above. The rocker shaft assembly 320 is easier and more cost effective to manufacture. Further, long drilling is replaced with cheaper tubes. In some examples the tubes can be commodity tubes similar to brake lines or other commonly available hydraulic tubes.

In one assembly process, the tubes 340, 342 and 344 can be stacked onto the separator plates 358. The tube assembly 322 and separator plates 358 can collectively be referred to as a tube subassembly 368. The tube subassembly 368 can be inserted into the sleeve 324. The sleeve 324 can have the passages 350 prearranged before accepting the tube assembly 368. Next, the tube subassembly can have an overmold 370 to capture the tube subassembly 368 within the sleeve 324. Holes 374 can then be drilled into the respective tubes 340, 342 and 344 using the passages 350 in the sleeve 324 as a guide for the drilling. In this regard, a drill can be aligned through the passages 350 to intersect each of the respective tubes 340, 342 and 344 to create the holes 374 in the respective tubes 340, 342 and 344. The overmold 370 provides a sealant.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A rocker shaft assembly configured to support a rocker arm and deliver oil to the rocker arm, the rocker shaft assembly comprising:
    a core shaft having a core body including at least two oil supply channels formed thereon; and
    a sleeve having passages formed thereon;
    wherein the sleeve is disposed around the core shaft, each of the at least two oil supply channels aligning with at least one passage of the passages on the sleeve,
    wherein the at least two oil supply channels are axially spaced-apart from each other,
    wherein the core body further defines a brake oil supply channel and wherein at least one passage of the passages aligns with the brake oil supply channel, and
    wherein the core body further defines at least one of a variable valve lift (VVL) and cylinder deactivation (CDA) channel formed thereon and wherein at least one passage of the passages aligns with the at least one of the VVL and CDA channel.

2. The rocker shaft assembly of claim 1, wherein the core shaft is press fit into the sleeve.

3. The rocker shaft assembly of claim 1, wherein the at least two oil supply channels are milled around an outer diameter of the core shaft.

4. The rocker shaft assembly of claim 3, wherein the at least two oil supply channels are in the form of a groove.

5. The rocker shaft assembly of claim 1, wherein the brake oil supply channel and the cylinder deactivation channel is milled around an outer diameter of the core shaft.

6. The rocker shaft assembly of claim 5, wherein the brake oil supply channel and the cylinder deactivation channel are in the form of grooves.

7. The rocker shaft assembly of claim 1, wherein the core shaft and sleeve are both formed of metal.

8. The rocker shaft assembly of claim 1, wherein the passages on the sleeve are cross drilled into the sleeve.

9. A rocker shaft assembly configured to support a rocker arm and deliver oil to the rocker arm, the rocker shaft assembly comprising:
    a tube assembly having a main supply tube and at least one of a brake oil supply tube, a variable valve lift (VVL) tube and a cylinder deactivation (CDA) tube;
    a sleeve having passages formed thereon; and
    at least one separator plate engaging the tube assembly for positioning the main supply tube and at least one of the brake oil supply tube, the variable valve lift (VVL) tube and the cylinder deactivation (CDA) tube relative to each other, wherein the sleeve is disposed around the tube assembly, wherein the passages intersect the main supply tube and the at least one of the brake oil supply tube, the VVL tube and the CDA tube.

10. The rocker shaft assembly of claim 9, further comprising an overmold between the sleeve and the tube assembly.

11. A rocker shaft assembly configured to support a rocker arm and deliver oil to the rocker arm, the rocker shaft assembly comprising:

a core shaft having a core body including at least two oil supply channels formed thereon; and a sleeve having passages formed thereon;

wherein the sleeve is disposed around the core shaft, each of the at least two oil supply channels aligning with at least one passage of the passages on the sleeve, wherein the at least two oil supply channels are axially spaced-apart from each other, and wherein one of the at least two oil supply channels is curved or bent in a circumferential direction.

\* \* \* \* \*